United States Patent [19]
Arai

[11] 4,161,350
[45] Jul. 17, 1979

[54] TELESCOPIC PHOTOGRAPHING LENS SYSTEM

[75] Inventor: Yasunori Arai, Asaka, Japan

[73] Assignee: Asahi Kogaku Kogyo Kabushiki Kaisha, Tokyo, Japan

[21] Appl. No.: 923,750

[22] Filed: Jul. 11, 1978

[30] Foreign Application Priority Data
Jul. 11, 1977 [JP] Japan .................... 52-82659

[51] Int. Cl.² ............................. G02B 9/34
[52] U.S. Cl. ................................. 350/220
[58] Field of Search ................... 350/220, 177

[56] References Cited
U.S. PATENT DOCUMENTS
3,868,174  2/1975  Yakota .................... 350/220 X

*Primary Examiner*—Paul A. Sacher
*Attorney, Agent, or Firm*—Sughrue, Rothwell, Mion, Zinn and Macpeak

[57] ABSTRACT

A telephoto lens system comprises four lenses which are, in order from the object, a positive lens, a negative lens, a positive lens each having a stronger curvature surface directed to the object, and the final lens is a negative meniscus lens concave to the object. The interlens distances are progressively larger from the object side of the system.

2 Claims, 4 Drawing Figures

TELESCOPIC PHOTOGRAPHING LENS SYSTEM

BACKGROUND OF THE INVENTION

The present invention relates to a relatively large aperture telescopic or telephoto type lens system having a viewing angle of about ±6° and an aperture ratio of about 1:3.5, composed of four lenses grouped into four components.

A conventional Ernostar type lens system having a large aperture has been provided as a four lens-four group lens construction; however, the aberration, astigmatism and distortion compensation are unsatisfactory in some respects.

SUMMARY OF THE INVENTION

Accordingly, it is an object of the present invention to provide a telephoto lens system which provides improved compensation and long focal length while still maintaining a high degree of miniaturization.

The present lens system is composed of a first positive lens, a second negative lens, a third positive lens and a fourth negative lens. More specifically, the first and second lenses are arranged near each other, the third lens is arranged at relatively wide interval and the fourth lens is arranged at wider interval in the rear portion of the lens system. For this reason, though the lens aperture of the present lens system is relatively large, the spherical aberration is very small, comatic aberration, astigmatism and distortion can be well compensated for and the length from the first lens surface to the image surface can be shortened in spite of its long focal distance.

DETAILED DESCRIPTION OF THE INVENTION

Figure 1:
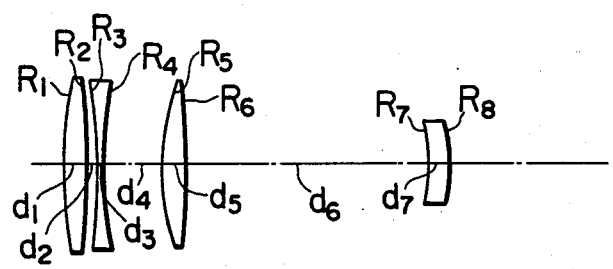
FIG. 1 is a diagrammatic view of one embodiment of a lens system according to the present invention.

The present invention will be hereinafter described in detail. As shown in FIG. 1, the present lens system is composed of four lenses grouped into four components. A first lens is a single positive lens wherein a lens surface having the stronger curvature is directed to the object. A second lens is a single negative lens with a lens surface having the stronger curvature directed to the object. A third lens is a single positive lens with a lens surface having the stronger curvature directed to the object. Finally, a fourth lens is a negative meniscus lens a concave surface of which faces the object. The aforementioned first and second lenses are arranged closely adjacent one another. The third lens is arranged at a relatively wide interval from the second lens. The fourth lens is positioned at a wider interval than that between the second and third lenses. The lens system should satisfy the following conditions.

$$\frac{N_1 + N_3}{2} < \frac{N_2 + N_4}{2}, N_1 < N_3 \quad (1)$$

$$\frac{\nu_1 + \nu_3}{2} - \nu_2 > 25, \nu_4 > 55 \quad (2)$$

(3) $0.55f < -f_2 < 0.75f$
(4) $0.85 < f_1/f_3 < 1.15$
(5) $0.08f < d_4 < 0.15f$
(6) $0.35f < d_6 < 0.5f$
(7) $f < -R_2 < 1.5f$
(8) $0.65f < -R_3 < 0.95f$
(9) $0.35f < R_5 < 0.45f$
(10) $0.1f < -R_7 < 0.2f$ where:
$N_i$ is the refractive index of the i-th lens on d-line;
$\nu_i$ is the Abbe's number of the i-th lens;
f is the overall focal length;
$f_i$ is the focal distance of the i-th lens;
$d_k$ is the distance between the k-th and (k+1)th lens surfaces; and
$R_k$ is the radius of curvature of the k-th lens surface.

The conditions will be hereinafter explained.

Condition (1) relates to the improvement of the Petzval's sum. Generally, in a telephoto lens system, depending on the degree of miniaturization, the Petzval's sum is excessively negative and, accordingly the yield curvature is overcompensated for. For this reason, it is necessary to make the Petzval's sum positive by using a low refractive index positive lens and a high refractive index negative lens. In the present invention, in order to attain the above-described object, the average value of the refractive indices of the two positive lenses must be smaller than that of the two negative lenses. However, in the present invention a lens having a higher refractive index than that of the first lens is employed as the positive third lens according to condition (4), which will be described later, so that an increase in the spherical aberration can be prevented.

A lens having a low refractive index must be employed as the fourth negative lens as in condition (2), which will be described later, in order to achieve an optical glass having a large Abbe's number.

Condition (2) defines an optical glass for chromatic aberration. In the present invention, the chromatic aberration must be sufficiently compensated for through the fore lens group consisting of the first, second and third lenses and the residual chromatic aberration must be finally compensated for through the rear lens group consisting of the fourth lens. More specifically, the condition (2) shows that in the fore lens group, the positive first and third lenses are made of optical glass having low dispersion characteristics and the negative second lens is made of optical glass having high dispersion characteristics, and the average value of the Abbe's numbers of the positive lenses is 25 or more higher than that of the negative lens so that the chromatic aberration can be compensated for by the appropriate lens power. The condition (2) shows that, in the rear lens group, a small amount of the uncompensated chromatic aberration accompanying light having short wavelength is compensated for by using optical glass having an Abbe's number of more than 55.

A suitable optical glass must be selected on the basis of the condition (2). Further, in order to compensate for the spherical aberration, the comatic aberration and the astigmatism and in order to shorten the overall length, conditions (3) and (4) must be met for a suitable lens power arrangement.

A suitable lens power of the second lens is defined by condition (3) and at the same time the above-mentioned aberration compensation and the reduction of the overall length is defined by condition (4) by suitably distributing the positive lens power to the first and third lenses. Below the lower limit of condition (3), that is, when $-f_2$ decreases, the negative refractive power of the second lens becomes large. In such a case, in order to compensate for the chromatic aberration it is necessary to enhance the positive refractive powers of the first and third lenses so that the spherical aberration is increased. Above the upper limit of condition (3) the spherical aberration is small but it is difficult to compensate for comatic aberration, astigmatism and even chromatic aberration.

Below the lower limit of condition (4), the first lens having a low refractive index is loaded with positive lens power. As a result, zonal spherical aberration increases. Above the upper limit of condition (4), the positive refractive power of the first lens is weakened. In this case, the positive refractive power of the third lens must increase. Because the refractive index of the third lens is higher than that of the first lens, the increase of zonal spherical aberration is reduced but because the negative refractive power of the second lens is too strong and because a long aerial space $d_4$ between the second and the third lenses is required, the miniaturization and shortening of the overall length can not be attained.

Condition (5), which is a most important feature in the present invention, relates to the chromatic aberration compensation and miniaturization of the overall length. In the present invention, since the second lens has a strong negative refractive index, widening of the aerial space $d_4$ between the second and third lenses is ineffective for reduction of the overall length. In contrast, if the aerial space is shortened the reduction of the overall length is also achieved, but the compensation for the luminous flux which does not pass through the optical axis becomes difficult. For this reason, the space $d_4$ must be appropriately determined in view of the telephoto ratio and the aberration compensation of the luminous flux other than the flux which passes through the optical axis. Condition (5) relates to this matter. That is, below the lower limit of condition (5) a large amount of chromatic aberration of the lower luminous flux which does not pass through the optical axis is excessively compensated for and astigmatism compensation is deteriorated.

Condition (6) relates to the miniaturization of the overall length. As is well known, the longer the distance between the front and rear lens group of telephoto type lens, the shorter the overall length, that is, the better the telephoto effect. In the present invention, the distance $d_6$ corresponds to that distance. The lower limit is given as 0.35 f to obtain the miniaturization of the overall lens system. In contrast, when the distance exceeds the upper limit of 0.5 f, the Petzval's sum is remarkably decreased and the field curvature is excessively compensated for.

As mentioned above, conditions (1) and (2) appropriately define an optical glass, conditions (3) to (6) appropriately define a lens power arrangement and, further, conditions (7) to (10) relate to compensation for the spherical aberration, coma aberration, astigmatism and distortion.

Conditions (7), (8) and (9) relate especially to coma aberration, astigmatism and distortion. In the present invention, the conditions are provided for the purpose of effectively balancing each refractive power of the image side surface of the first lens which has large positive refractive power, the object side surface of the second lens which has a large negative refractive power and the image side surface of the third lens which has a positive refractive power. More specifically, if $-R_2$ becomes larger than 1.5f, the convergent characteristic of the first lens is lowered so that the aberration compensation can not be achieved with the convergent characteristic of only the third lens. When $-R_2$ becomes smaller than f, exceeding the lower limit, the refractive power of the second surface is excessive. In order to compensate for this, the negative refractive power of the third surface must be enhanced. As a result, it is difficult to balance the coma aberration, astigmatism and spherical aberration.

When $-R_3$ exceeds the upper limit of condition (8) the divergency is abruptly increased so that the coma aberration, astigmatism and distortion are left without sufficient compensation. Below the lower limit of condition (8), the divergent characteristic is too strong so that the spherical aberration is excessively compensated for.

Condition (9) relates to the aberration compensation, balancing the divergency of the second lens together with condition (7). When $R_5$ exceeds the upper limit, coma aberration and astigmatism compensation are deteriorated. Below the lower limit of condition (9), the spherical aberration is not sufficiently compensated for and compensation of the off-axial lateral chromatic aberration is deteriorated.

If conditions (7), (8) and (9) are satisfied, the coma aberration, astigmatism and distortion are sufficiently compensated for but the spherical aberration is not. For this reason, in the fourth lens, it is necessary to compensate for the spherical aberration without generation of the coma aberration and astigmatism with respect to the luminous flux not along the optical axis.

Condition (10) relates the above matter. When $-R_7$ exceeds 0.2f, the spherical aberration compensation is insuffficient. Below the lower limit of condition (10), when $-R_7$ is less than 0.1f, not only is the spherical aberration excessively compensated for but the Petzval's sum is decreased and the field curvature is also excessively compensated.

Examples of lens systems according to the present invention are as follows, where
W: half viewing angle
F: aperture ratio
K: telephoto ratio

EXAMPLE 1

The lens construction of Example 1 is shown in FIG. 1.

$f=100 \quad F=1:3.5 \quad f_B=27.68 \quad K=0.94 \quad -f_2=62.3$
$f_1/f_3=1.03$

| lens surface | R | d | n | ν |
|---|---|---|---|---|
| 1 | 49.692 | | | |
| | | 4.026 | 1.51633 | 64.1 |
| 2 | −111.380 | | | |
| | | 2.226 | | |
| 3 | −74.103 | | | |
| | | 1.282 | 1.68893 | 31.1 |
| 4 | 102.736 | | | |

-continued

| lens surface | R | d | n | ν |
|---|---|---|---|---|
| 5 | 41.067 | | | |
| | | 10.031 | | |
| | | 3.569 | 1.62230 | 53.2 |
| 6 | −2355.821 | | | |
| | | 43.231 | | |
| 7 | −17.489 | | | |
| | | 2.308 | 1.51633 | 64.1 |
| 8 | −34.694 | | | |

Figure 2:
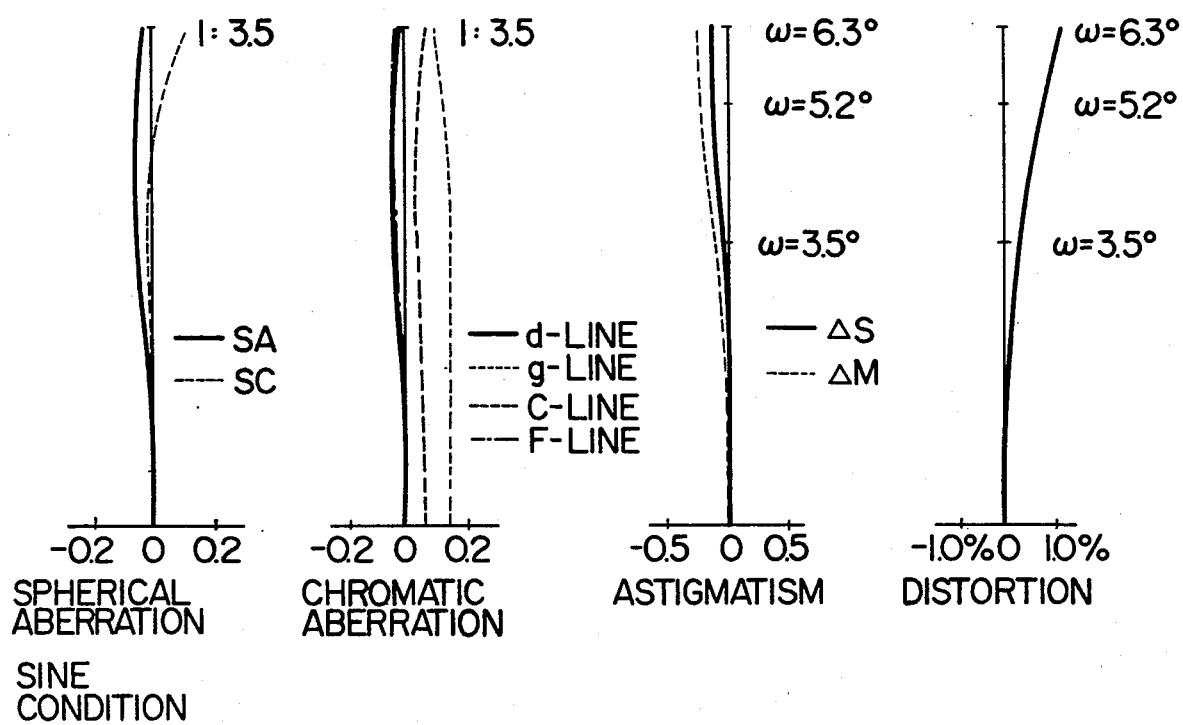
FIG. 2 comprises graphs illustrating the characteristics of the lens system of FIG. 1.

The spherical aberration, sine condition, chromatic aberration, astigmatism and distortion with respect to the infinite objects are shown in FIG. 2.

EXAMPLE 2

Figure 3:
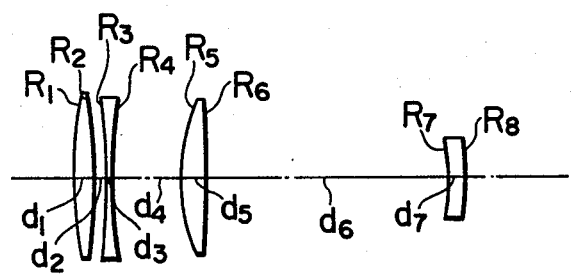
FIG. 3 is a diagrammatic view of a second embodiment of a lens system according to the present invention.

The lens construction of Example 2 is shown in FIG. 3.

$f=100$   $F=1:3.5$   $f_B=26.306$   $K=0.95$   $-f_2=69.8$
$f_1/f_3=1.06$

| lens surface | R | d | n | ν |
|---|---|---|---|---|
| 1 | 50.198 | | | |
| | | 3.580 | 1.51633 | 64.1 |
| 2 | −135.962 | | | |
| | | 2.731 | | |
| 3 | −81.79 | | | |
| | | 1.048 | 1.69895 | 30.1 |
| 4 | 121.817 | | | |
| | | 12.253 | | |
| 5 | 40.933 | | | |
| | | 3.443 | 1.61117 | 55.9 |
| 6 | 7985.325 | | | |
| | | 43.145 | | |
| 7 | −17.280 | | | |
| | | 2.621 | 1.48749 | 70.1 |
| 8 | −38.071 | | | |

Figure 4:
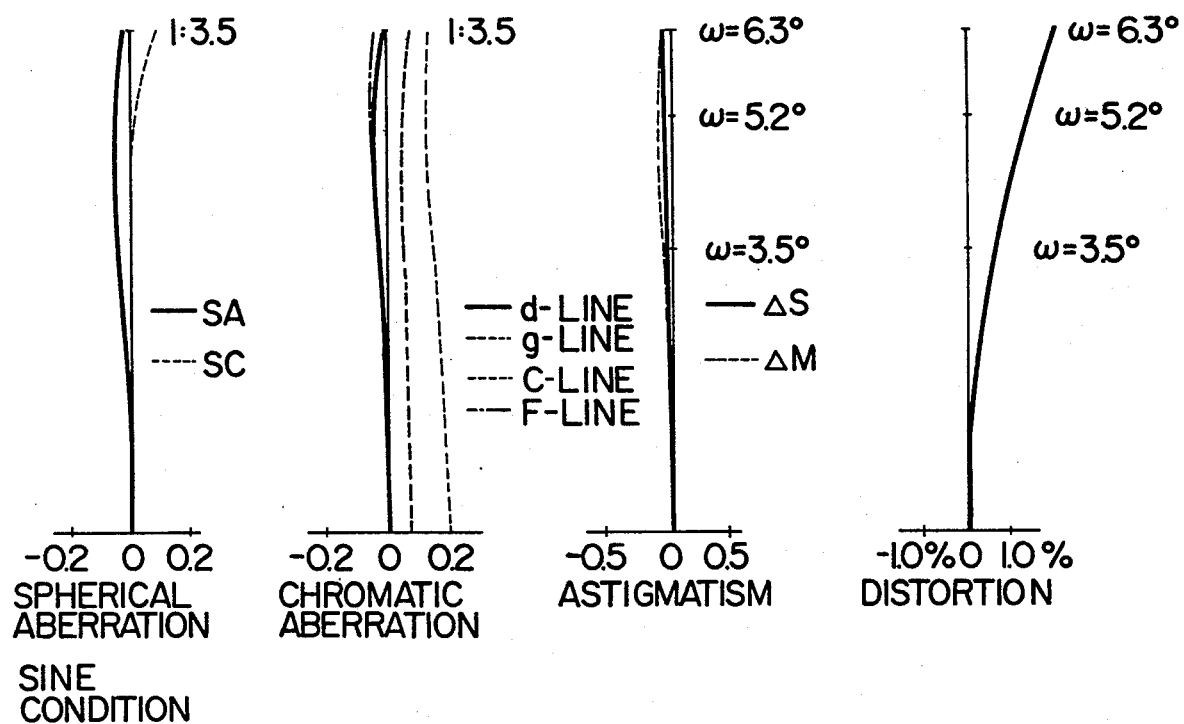
FIG. 4 comprises graphs illustrating the characteristics of the lens system of FIG. 3.

The spherical aberration, sine condition, chromatic aberration, astigmatism and distortion with respect to the indefinite object are shown in FIG. 4.

What is claimed is:

1. A telephoto lens system comprising four lenses grouped into four components wherein a first lens is a positive lens having a stronger curvature surface directed to the object, a second lens is negative lens having a stronger curvature surface directed to the object, a third lens is a positive lens having a stronger curvature surface directed to the object and a fourth lens is a negative meniscus lens having a concave surface directed to the object, the distances between the first and second lenses the second and third lenses the third and fourth lenses being progressively greater, said lens system satisfying the following conditions:

$$\frac{N_1 + N_3}{2} < \frac{N_2 + N_4}{2}, N_1 < N_3 \quad (1)$$

$$\frac{\nu_1 + \nu_3}{2} - \nu_2 > 25, \nu_4 > 55 \quad (2)$$

(3) $0.55f < -f_2 < 0.75f$
(4) $0.85 < f_1/f_3 < 1.15$
(5) $0.08f < d_4 < 0.15f$
(6) $0.35f < d_6 < 0.5f$
(7) $f < -R_2 < 1.5f$
(8) $0.65f < -R_3 < 0.95f$
(9) $0.35f < R_5 < 0.45f$
(10) $0.1f < -R_7 < 0.2f$ where: $N_i$ is the refractive index of the i-th lens on d-line;
$\nu_i$ is the Abbe's number of the i-th lens;
f is the overall focal length;
$f_i$ is the focal distance of the i-th lens
$d_k$ is the distance between the k-th and (k+1)th lens surfaces; and
$R_k$ is the radius of curvature of the k-th lens surface and further defined by:
$f=100$   $F=1:3.5$   $f_B=27.68$   $K=0.94$   $-f_2=62.3$
$f_1/f_3=1.03$

| lens surface | R | d | n | ν |
|---|---|---|---|---|
| 1 | 49.692 | | | |
| | | 4.026 | 1.51633 | 64.1 |
| 2 | −111.380 | | | |
| | | 2.226 | | |
| 3 | −74.103 | | | |
| | | 1.282 | 1.68893 | 31.1 |
| 4 | 102.736 | | | |
| | | 10.031 | | |
| 5 | 41.067 | | | |
| | | 3.569 | 1.62230 | 53.2 |
| 6 | −2355.821 | | | |
| | | 43.231 | | |
| 7 | −17.489 | | | |
| | | 2.308 | 1.51633 | 64.1 |
| 8 | −34.694 | | | | where
F=aperture ratio
K=telescopic ratio
$f_B$=back focal length

2. A telephoto lens system comprising four lenses grouped into four components wherein a first lens is a positive lens having a stronger curvature surface directed to the object, a second lens is negative lens having a stronger curvature surface directed to the object, a third lens is a positive lens having a stronger curvature surface directed to the object and a fourth lens is a negative meniscus lens having a concave surface directed to the object, the distances between the first and second lenses the second and third lenses the third and fourth lenses being progressively greater, said lens system satisfying the following conditions:

$$\frac{N_1 + N_3}{2} < \frac{N_2 + N_4}{2}, N_1 < N_3 \quad (1)$$

$$\frac{\nu_1 + \nu_3}{2} - \nu_2 > 25, \nu_4 > 55 \quad (2)$$

(3) $0.55f < -f_2 < 0.75f$
(4) $0.85 < f_1/f_3 < 1.15$
(5) $0.08f < d_4 < 0.15f$
(6) $0.35f < d_6 < 0.5f$
(7) $f < -R_2 < 1.5f$
(8) $0.65f < -R_3 < 0.95f$
(9) $0.35f < R_5 < 0.45f$
(10) $0.1f < -R_7 < 0.2f$ where:
$N_i$ is the refractive index of the i-th lens on d-line;
$\nu_i$ is the Abbe's number of the $i-th$ lens;
f is the overall focal length;
$f_i$ is the focal distance of the i-th lens;
$d_k$ is the distance between the k-th and (k+1)th lens surfaces; and
$R_k$ is the radius of curvature of the k-th lens surface and further defined by:

$f=100$  $F=1:3.5$  $f_B=26.306$  $K=0.95$  $-f_2=69.8$
$f_1/f_3=1.06$

| lens surface | R | d | n | ν |
|---|---|---|---|---|
| 1 | 50.198 | | | |
| | | 3.580 | 1.51633 | 64.1 |
| 2 | −135.962 | | | |
| | | 2.731 | | |
| 3 | −81.79 | | | |
| | | 1.048 | 1.69895 | 30.1 |
| 4 | 121.817 | | | |
| | | 12.253 | | |
| 5 | 40.933 | | | |
| | | 3.443 | 1.61117 | 55.9 |
| 6 | 7985.325 | | | |
| | | 43.145 | | |
| 7 | −17.280 | | | |
| | | 2.621 | 1.48749 | 70.1 |
| 8 | −38.071 | | | | where
F=aperture ratio
K=telescopic ratio
$f_B$=back focal length.

* * * * *